United States Patent [19]

Whippie et al.

[11] Patent Number: 4,603,461
[45] Date of Patent: Aug. 5, 1986

[54] GARAGE DOOR SPRING STRETCHER

[76] Inventors: Jerald R. Whippie, 1113 W. Workman Ave., West Covina, Calif. 91790; John F. Hartman, 1380 Calle Galante, San Dimas, Calif. 91773

[21] Appl. No.: 682,982

[22] Filed: Dec. 18, 1984

[51] Int. Cl.⁴ ............................................ B23P 19/04
[52] U.S. Cl. ..................................... 29/227; 254/10.5
[58] Field of Search ............... 29/227; 254/10.5, 262, 254/213, 223, 224

[56] References Cited

U.S. PATENT DOCUMENTS

| | | | |
|---|---|---|---|
| 1,056,303 | 3/1913 | Riley | 254/213 |
| 1,869,113 | 7/1932 | Noell | 254/223 |
| 2,617,180 | 11/1952 | Wilkerson | 29/227 |
| 4,066,242 | 1/1978 | Allevato | 254/10.5 |

Primary Examiner—James L. Jones, Jr.
Attorney, Agent, or Firm—Georges A. Maxwell

[57] ABSTRACT

A device for tensioning and extending an elongate helical tension spring, one end of which is anchored and the other free end of which is disposed toward and spaced from a structure to which the spring is to be connected. The device includes a frame with a spring engaging saddle engageable with a side of the spring, between the ends thereof. The device next includes an elongate flexible girdle with one end anchored to the frame extending about the spring and having the other end releasably coupled to the frame. The device next includes a manually rotatable winch drum carried by the frame, a manually operable ratchet releasably stopping rotation of the drum and an elongate tow line with one end portion connected with and wound about the drum and its other end portion extending to and releasably coupled to the structure to which the spring is to be connected.

10 Claims, 12 Drawing Figures

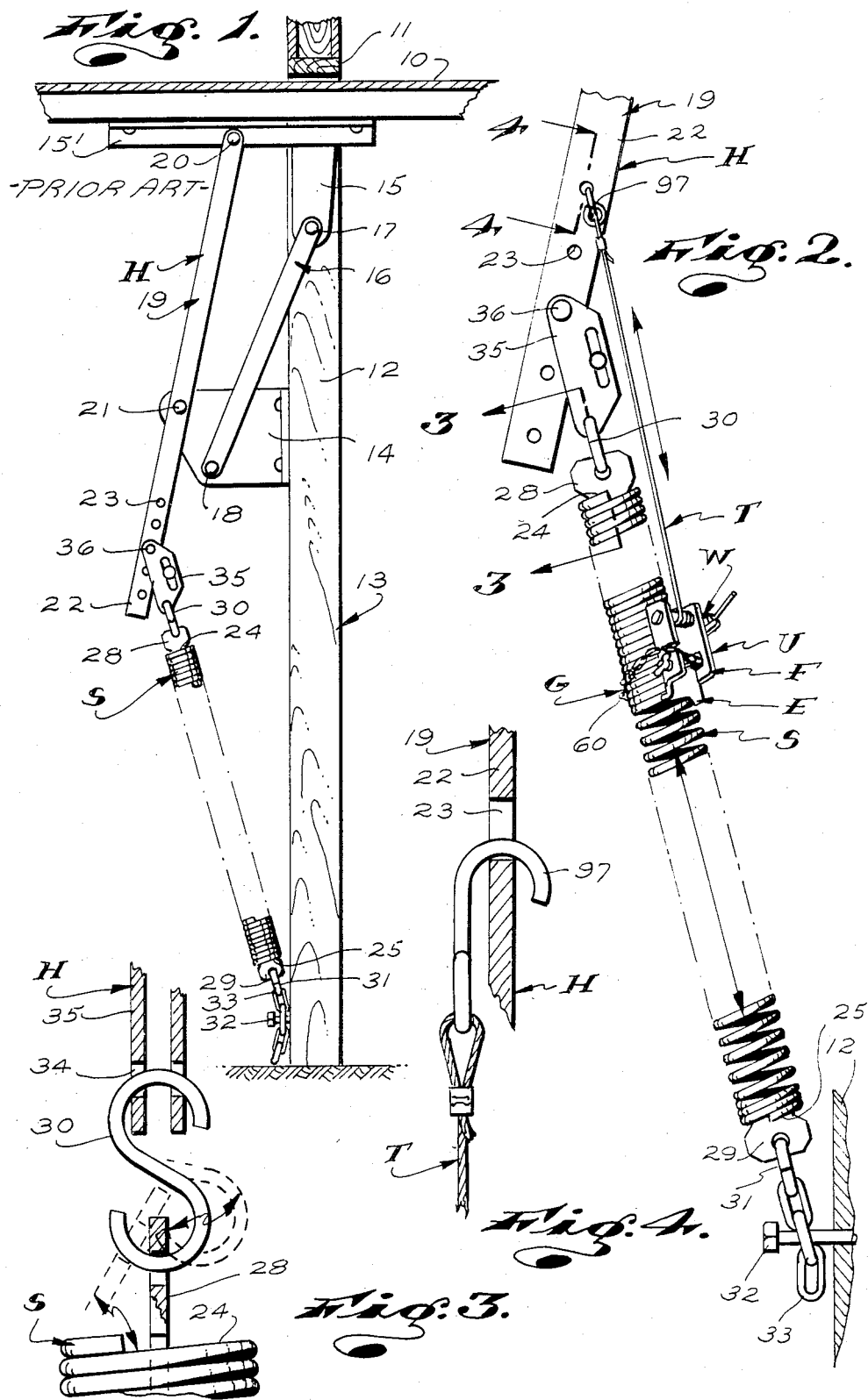

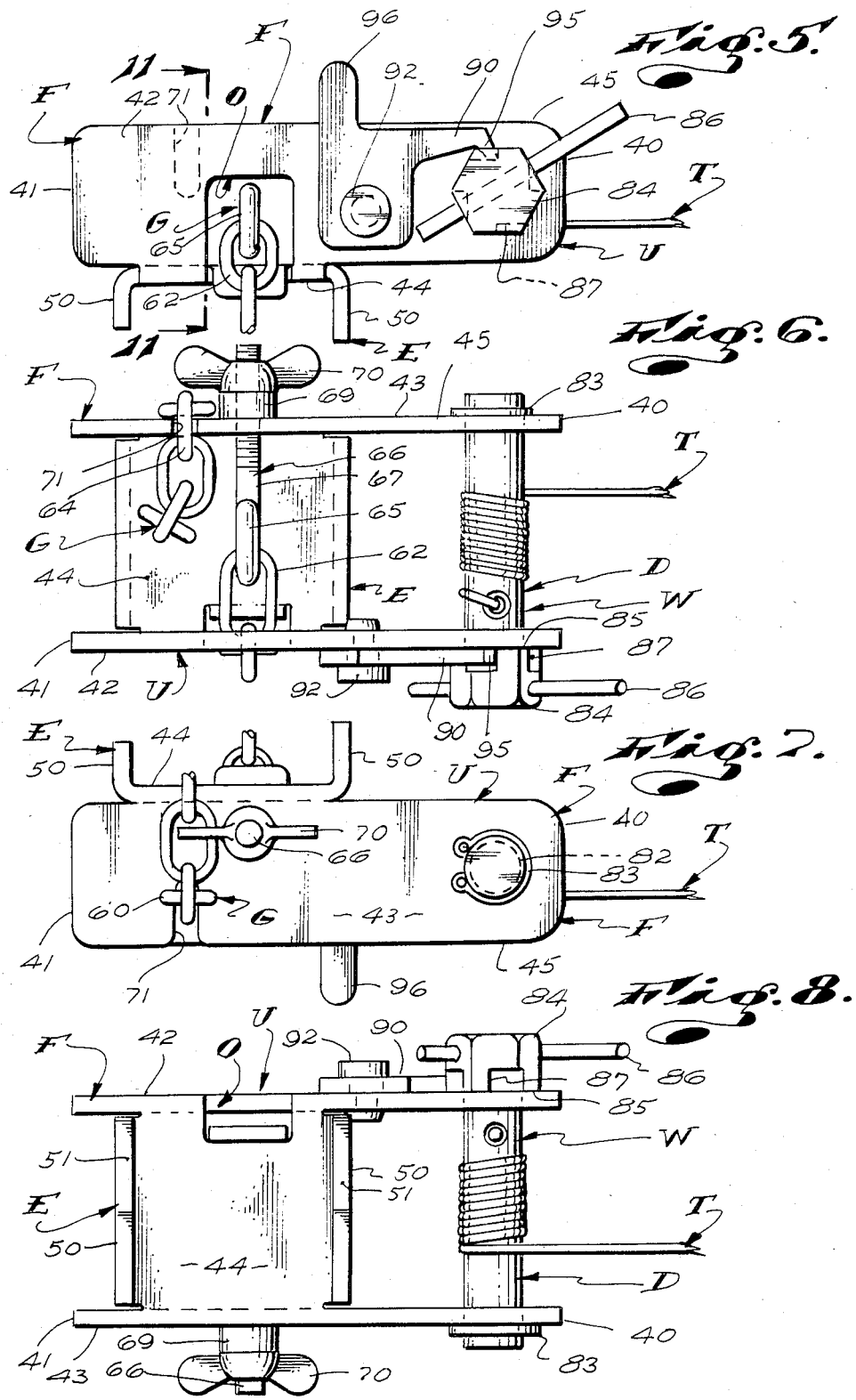

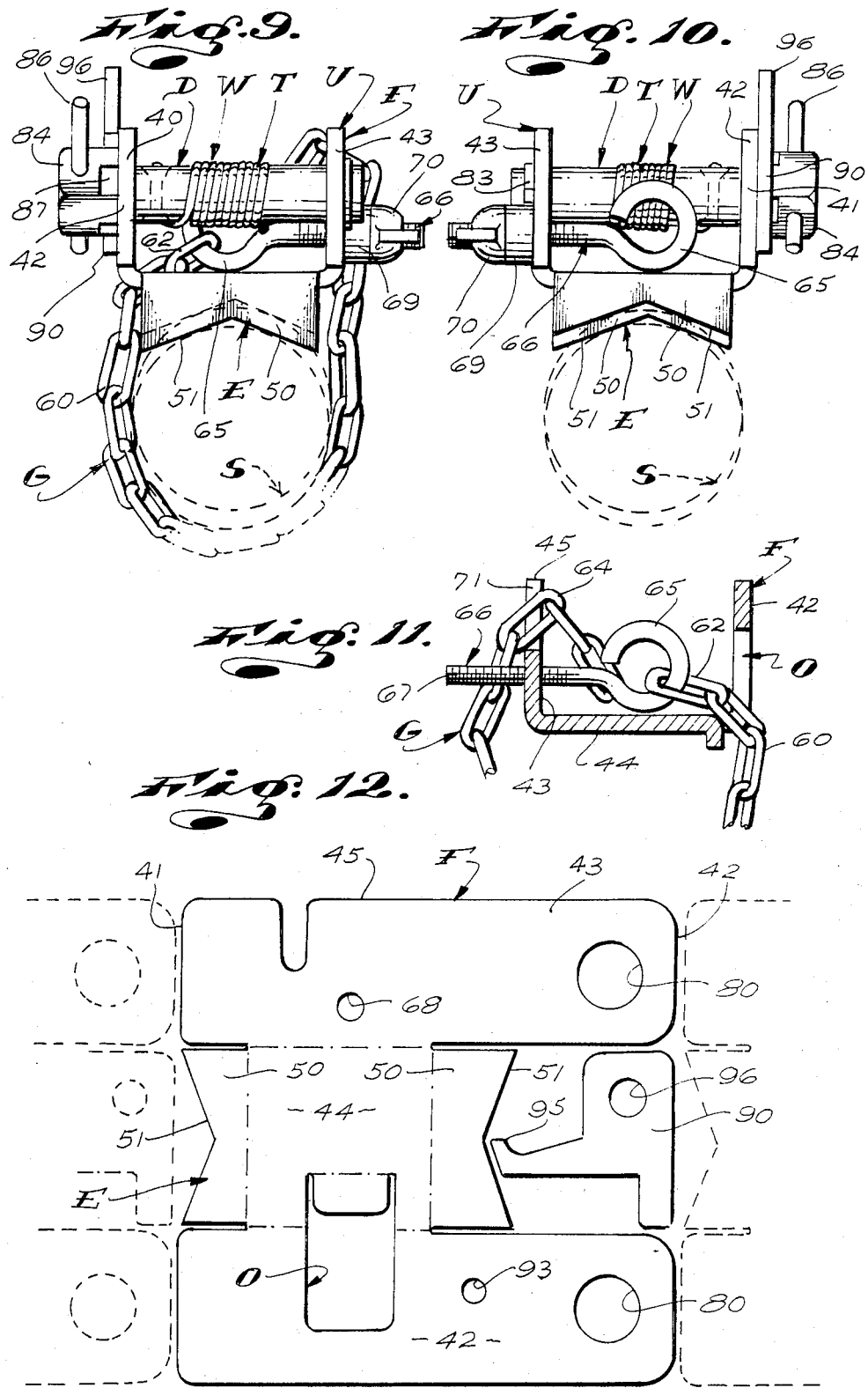

GARAGE DOOR SPRING STRETCHER

This invention has to do with a device for yieldingly extending elongate coil springs and is particularly concerned with a garage door spring extender.

BACKGROUND OF THE INVENTION

Throughout the industrial art, elongate coil tension springs are widely used. Such springs are most commonly provided with mounting loops, rings or apertured plates at their terminal ends to facilitate connecting them in and with related mechanisms. It is not infrequent that such springs, when installed in or removed from their related mechanisms, must be manually tensioned and elongated in order to connect or couple them in and with their related mechanism. In many instances, such springs are so large and strong that they are extremely difficult to manually tension for installation and are do disposed to the mechanisms with which they are related that to manually tension, elongate and install them is extremely awkward and difficult.

The difficulties and problems associated with elongating and installing elongate coil tension springs are commonly associated with and characterize the installation of such springs in those counter-balanced hinge systems or hardware provided to mount garage doors and which are characterized by pivotally related links and levers fixed to and arranged between a related garage door frame and garage door and in which one or more elongate coil tension springs are engaged with and between one lever and a reactive part of the door structure, such as the garage door frame. One typical form of garage door hardware in which coil springs are employed is fully disclosed in U.S. Pat. No 3,555,590, issued Jan. 19, 1971 and assigned to Homes Hardware and Sales Co. That patented hardware is manufactured and sold by Homes-Halley Industries of Los Angeles, Calif. and is called a "jam type one-piece garage door hardware" or "pivot type garage door hardware".

Throughout the development of the art of spring loaded pivot type garage door hardware, it has been recognized that the necessity to tension and stretch the spring in such hardware to install and/or remove those springs presents a major and serious problem. In efforts to overcome that problem, the manufacturers of such hardware have sought to incorporate various spring tensioning and/or adjusting means which can be operated to make installation and removal of the springs less difficult. Most of those spring tensioning and/or adjusting means provided by the prior art have proved to be less than satisfactory for one or more reasons. Those reasons are generally peculiar to each different form of hardware and/or the environment in which it is used. Accordingly, any attempt to list and/or cite those problems which are likely to be encountered would be extremely burdensome and would serve no useful purpose.

As a result of the foregoing, the prior art has provided a number of different special means and/or devices for biasing, lengthening and otherwise working upon garage door springs to facilitate installation and/or removal of such springs in and with their related hardware. Those special means and devices disclosed in U.S. Pat. Nos. 3,014,711, 3,588,074, 3,741,558, 3,747,898 and 4,066,242 are typical of those means and devices for working on garage door springs that the prior art has offered. While certain of the above noted patented means and devices are known to have been adopted and put to use, none is known to have attained any appreciable recognition as a good and satisfactory or desirable means or device for serving its intended end. For example, that screw operated spring tensioning device or means disclosed in U.S. Pat. No. 3,741,558 has proven to be too slow and difficult to operate and further, it is such that it is often rendered inoperative by rust and the like during those protracted periods of time when its use is not resorted to.

In accordance with the above, there is an apparent yet to be satisfied need and want for an effective and efficient device for tensioning and extending garage door springs to facilitate installation and removal of such spring in and with their related garage door hardware.

OBJECTS AND FEATURES OF OUR INVENTION

It is an object of our invention to provide an easy and economical to make; easy, convenient and safe to use elongate coil spring tensioning and extending device which is particularly suitable for tensioning and extending garage door springs to facilitate installing them in their related garage door hardware.

It is an object and feature of our invention to provide a device for the purpose set forth above which includes a manually operable winch unit with a spring engaging saddle, a flexible or articulated spring engaging girdle releasably securing the saddle on a related elongate coil spring, one end of which spring is anchored or securd and the other end of which spring is yet to be anchored or secured and an elongate flexible tow line or tether on the winch and extending to and releasably connected with that structure with which the yet to be anchored or secured end of the spring is to be connected, whereby operation of the winch tensions and extends the spring and moves said yet to be connected end thereof toward that structure to which it is to be connected.

It is another object and feature of our invention to provide a device of the general character referred to above which is such that it can be advantageously related to and can work upon a wide variety of different diameters and lengths of elongate coil tension spring and which is such that it is not affected by the form and nature of the connecting means and/or parts at and between the ends of the springs and their related structures.

Still another object and feature of our invention is to provide a device of the general character referred to above which, by its form and construction, is such that persons of ordinary mechanical skill can readily perceive its use and functioning and can easily, quickly and rapidly put it to its intended use without the exercise of any special tools and/or skills.

Finally, it is an object and feature of our invention to provide a device of the general character referred to above which is extremely simple in construction and is such that it can be procuded and sold at a sufficiently low cost that the ordinary home owner can purchase the device and garage door springs that are required to replace old springs of the garage door hardware in his garage at substantially less cost than those charges normally exacted by professional mechanics to replace garage door springs.

The foregoing and other objects and features of our invention will be fully understood from the following detailed description of one preferred form and embodiment of our invention, throughout which description reference is made to the accompanying drawings.

DESCRIPTION OF THE DRAWINGS

FIG. 1 is a sectional view of a prior art overhead swinging garage door structure with garage door hardware at one end thereof shown in elevation;

FIG. 2 is an enlarged view of a portion of the hardware shown in FIG. 1 with out device related to it;

FIG. 3 is an enlarged detailed sectional view taken as indicated by line 3—3 on FIG. 2;

FIG. 4 is an enlarged detailed sectional view taken as indicated by line 4—4 on FIG. 2;

FIG. 5 is a view of one side of our winch unit;

FIG. 6 is a top view of our winch unit;

FIG. 7 is a view of the other side of our winch unit;

FIG. 8 is a bottom view of our winch unit;

FIG. 9 is a view of one end of our winch unit;

FIG. 10 is a view of the other end of our winch unit;

FIG. 11 is a sectional view taken substantially as indicated by line 11—11 on FIG. 5; and FIG. 12 is a plan view of a partially formed stamped metal part of our device.

DETAILED DESCRIPTION OF OUR INVENTION

In FIG. 1 of the drawings, we have illustrated a typical form of spring loaded garage door hardware H in which the spring might be advantageously tensioned and extended by means of our device to effect its instalalation and/or removal.

In FIG. 1 of the drawings, a door 10, in horizontal overhead or open position, occurs below the header 11 and adjacent one side or jam 12 of a related door frame 13. The hardware H includes a first mounting plate 14 fixed to the jam 12, a second mounting plate 15 fixed to the door 10, a short lever arm 16 extending between and pivotally mounted to the plates 14 and 15, as at 17 and 18, a mounting part 15' on the door and a long lever arm 19 extending between and pivotally mounted to the plate 14 and part 15' as at 20 and 21. The long lever arm 19 has an outer free end portion 22 with longitudinally spaced spring mounting apertures 23. An elongate coil tension spring S with upper and lower ends 24 and 25 extends between the free end portion 22 of the arm 19 and the lower end portion of the jam 12 of the door frame. The upper and lower ends 24 and 25 of the spring S can be formed with loops or, as shown, can have apertured terminal plates 28 and 29 related to them to facilatate anchoring the ends of the springs to their related structures. The loops or plates 28 and 29, whichever the case might be, are provided with and pivotally carry anchor hooks 30 and 31. The hooks 31 related to the lower end of the spring is engaged with anchoring means at the lower end of the door frame jam 12 which, in the case illustrated, includes a lag bolt 32 engaged in the jam 12 and a short length of chain 33 engaged with and between the bolt 32 and the hook 31. The hook 30 can be hookedly engaged in one of the apertues 23 in the arm 19 or, as shown in the drawings, can be hookedly engaged in apertures 34 in one end of a short link-like coupler unit or part 35 which coupler part has another or opposite end pivotally connected with the arm 19 by means of a pin 36 engaged through one of said apertures 23 in the arm.

The spring s is normally in tension.

The rule of action and/or operation of the related door, frame and hardware set forth above and shown in the drawings is well known to those skilled in the art and need not be described for a complete disclosure and understanding of our invention. It will suffice to note and state that the spring S, being normally in tension, must be drawn and extended axially in order to effect turning and engaging one or the other of the hooks 30 or 31 into and out of hook engagement with its related anchoring structure of the hardware, when installing or removing the spring.

In connection with the foregoing, when tensioning and extending the spring S (when installing or removing it), the hook at one end thereof is normally hooked and/or connected with its related part of the hardware H. Accordingly, the spring need only be extended in the direction of the other end thereof in order to engage or disengage the hook at said other end to effect installation or removal of the spring. That is, referring to FIG. 1 of the drawings, the lower end portion of the spring S can be extended downwardly or the upper end portion of the spring can be extended upwardly to effect engagement of disengagement of the lower hook 31 or the upper hook 30, as desired or as circumstances require. For the purpose of illustration, we will, in the following describe and show the upper portion of the spring S being drawn and extended upwardly to effect engagement and/or disengagement of the hook 30 from within the apertures 34 in the part 35.

The spring tensioning or extending device that we provide and which is shown in FIGS. 2 through 12 of the drawings includes a small compact winch unit U. The winch unit U, as shown in the drawings, includes an elongate frame F with upper and lower ends 40 and 41 opposite sides 42 and 43 and which will herein be called inner and outer sides 44 and 45.

The frame is a unitary stamped and formed, U-shaped sheet metal part with an elongate base or inner wall that establishes said inner side 44 of the frame and has laterally spaced, parallel, longitudinally extending side walls projecting upwardly from opposite sides of the base or inside wall 44 and which define the opposite sides 42 and 43 of the frame. The outer edges of the side walls define the outer side 45 of the frame and the upper and lower ends of those walls define the upper and lower ends of the frame.

The upper and lower ends of the inner or base wall 44 are bent inwardly and form a pair of longitudinally spaced inwardly projecting, laterally extending flanges 50. The inner transverse edges 51 of the pair of flanges 50 are V-shaped with opposite outwardly inclined converging portions. The flanges 50 define and/or establish a spring-engaging saddle E.

The saddle E defined by the pair of flanges 50 has a longitudinaly axis which is parallel with and radially offset from the central axis of a related spring S, when the frame F is positioned adjacent the spring, with the saddle E in seated engagement therewith and as clearly shown in FIGS. 2, 9 and 10 of the drawings. In addition to the foregoing, the frame F of the device D includes a girdle G to embrace the spring S and releasably hold the saddle E of the frame in seated engagement therewith.

The girdle G can vary widely in details on construction and is preferably an elongate flexible part with one end connected or anchored tothe frame F and with its other end portion releasably coupled with the frame, whereby the girdle can be easily manually extended from the frame, about an adjacent spring and have its other end releasably coupled with the frame.

In the form of the invention illustrated, the girdle is established of a length of chain 60.

The anchored or anchor end of the girdle chain 60 extends laterally through a window opening O formed in the side wall 42 of the frame. The terminal link 62 at the anchor end of the girdle chain 60 is engaged through the eye 65 of an elongate eye-bolt 66, which eye occurs within the frame F, between the side walls thereof and outward of the inner or base wall 44 thereof. The eye-bolt 66 has a threaded shank 67 which is engaged through an aperture 68 in the other side wall 43 of the frame. A nut and washer assembly comprising a spacer washer 69 and a wing-nut 70 are engaged on the shank 67 outside the frame and engaging the exterior of the wall 43 thereof. The nut is operable to move and draw the bolt 66 laterally of the frame and to thereby draw or move the anchor end of the girdle chain laterally of the frame and to thereby adjust the girdle chain as will hereinafter be described.

The free end portion of the girdle chain has one of its links 64 engaged in and extending through a laterally and outwardly opening cleat 71 defined by a slot in the side wall 43. The cleat defining slot is formed to freely accommodate one link of the girdle chain when the flat plate of that link is parallel with the longitudinal axis of the slot and which will not accommodate and will stop or prevent movement of those links adjacent to said one link.

A desired one of the links 64 defining the free end portion of the girdle chain can be easily and conveniently manually engaged in the cleat 71. Accordingly, the effective length of the girdle chain can be adjusted to establish close engagement about a wide variety of different diameters of springs with which our device might be related.

In practice, if the adjustment of the length of the girdle chain afforded by the links 64 thereof is not effective to establish desired or appropriate engagement of the chain about a related spring, the wing-nut 70 on the eye-bolt can be manually operated to tighten or loosen the chain, about the spring, as desired or as circumstances require.

In accordance with the foregoing, it will be apparent that the girdle G that we provide is a manually operable and adjustable girdle which is such that it can effectively releasably mount and maintain the frame F of the unit U in working position at and along one side of a related spring, at any desired location longitudinally of that spring.

Our device next includes a winch or windlass W at the upper end portion of the frame F and a tow line T related to that windlass.

The windlass W includes a windlass drum D in the form of an elongate cylindrical shaft extending laterally of the frame F at the upper end portion thereof and through axially aligned bearing openings 80 formed in the side walls 42 and 43 of the frame. The drum D has a through opening between its ends and within the confines of the frame to receive an end of the tow line T, as will hereinafter be described. One end of the drum extends outwardly from the side wall 43 of the frame and has an annular groove 82 formed therein. A retainer, in the form of a snap-ring 83 is engaged in the groove 82 and established bearing engagement on the exterior surface of the side wall 43. The other end of the drum extends through its related opening in the side wall 42 of the frame F and is formed with an enlarged elongate head 84. The head 84 has a laterally inwardly disposed bearing surface 85 in engagement with the exterior surface of the wall 42 and has a lateral inner cog wheel portion and an outer drive portion. The outer drive portion of the head 84 is preferably polygonal or hexagonal in cross-section and is such that a standard drive socket can be engaged about it to effect turning the drum. The drive portion of the head also has a through opening in which an elongate manually engageable turning bar or lever 86 is slidably removably engaged.

The inner cog wheel portion of the head 84 is formed with a plurality of circumferentially spaced radially outwardly opening ratchet notches 87 defining stop shoulders. The stop shoulders are disposed circumferentially in that direction counter to the direction in which the drum is rotated to exert tensile forces onto the tow line T. For example, the shoulders are disposed counter-clockwise with respect to clockwise rotation of the head, as viewed from the head end of the drum.

The windlass next includes an elongate flat plate-like pawl 90 with upper and lower ends and positioned adjacent the outer surface of the side wall 42 on a common plane with the radial plane of the cog wheel portion of the head 84. The lower end of the pawl 90 is pivotally mounted to the side wall 42, downward fromt he cog wheel portion of the head 84 by a headed shouldered pivot pin 92 engaged through registering openings 93 and 96 in the side wall 42 and pawl 90, as clearly shown in FIGS. 5, 6, 8 and 12 of the drawings.

The upper end of the pawl 90 extends upwardly adjacent the outer side of the cog wheel portion of the head 84 and is formed with a top or dog 95 that normally enters the ratchet notches 87 of the cog wheel portion of the head and establishes stopped engagement on and with the shoulders thereof, as best shown in FIGS. 5 and 6 of the drawings.

Finally, the pawl 90 has a normally outwardly projecting manually engageable lever arm 96 to facilitate manual pivoting of the pawl into and out of working engagement with the cog wheel portion of the head 84.

In practice, the parl 90 can be frictionally engaged on the side wall 42 so that it normally remains in set position or can, if desired, be normally yieldingly urgd and held in locking or working engagement with the head 84 by a simple spring (not shown), such as a rat trap spring, suitably engaged with and between the side wall 42 and the pawl 90.

The tow line T is a simple elongate length of flexible line with a fixed lower end engaged through the through opening in the drum D and knotted or otherwise secured to the drum so that it will not pull out of engagement therewith.

The tow line T has a free upper end coupled with and carrying a tow hook 97.

The lower portion of the tow line T is wound counter-clockwise about the drum and the upper portion thereof extends up and freely from the drum and the frame F to be releasably hooked and secured to a reactive structure by means of the hook 97. In the case illustrated, the hook 97 is engaged in and through one of the apertures 23 in the lever arm 19 of the garage door hardware H, as clearly shown in FIGS. 2 and 4 of the drawings.

When the device D that we provide is related to the spring S and lever arm 19 of the garage door hardware H and as shown in FIGS. 1 through 4 of the drawings and upon manual clockwise turning of the windlass drum D, it will be apparent that the portion of the spring S below the unit U is biased and elongated axially and that the portion of the spring above the unit U is elevated or moved axially upwardly so that the hook 30 thereon can be easily and conveniently moved and manipulated into and/or out of hook engagement with the coupling part 35, as indicated in dotted lines in FIG. 3 of the drawings.

In use, the pawl 90 is moved to a released position and the windlass is turend to extend the spring to a desired extent, whereupon the pawl is manually moved to its locking position. Thereafter, the spring can be worked upon as desired. When work upon the spring is completed, the head 84 is turned to release pressure on the pawl and the pawl is manually released. Upon release of the pawl, the drum is free to turn and the spring is allowed to return to its normal condition.

In practice, the frame F and pawl 90 can be easily and economically formed by easy and economical to perform stamping and forming operation which results in littel waste of material. In FIG. 12 of the drawings, we have shown the blank stampings that are required to form the frame F and pawl 90 and graphically illustrate the fact that the raw material of which those parts are established is conservatively used. The head drum of the windlass W is an extremely easy and economical to make part which is particularly suitable to be produced by any shop equipped to make common cold-headed bolts. The eye-bolt 66, washer 69, wing-nut 70, girdle chain 50, tow line T, hook 59, bar 86, and pin 92 are all standard inexpensive and easy to work with parts and materials. The cost of labor to assemble our unit is extremely low. It has been conservatively estimated that the cost of manufacturing our unit in lots of 1,000 would not exceed $2.50 and that the units could be profitably marketed for less than $10.00.The conservative estimated minimum charges exacted by professional garage door hardware installers to change or install a single garage door spring is in excess of $35.00. Accordingly, the average home owner with minimum mechanical skill can, upon purchasing a unit for $10.00 and installing a single garage door spring, can expect to save approximately $25.00. Having once purchased and used our device, the purchaser of our device can expect to save the entire cost of professional service each subsequent time he finds it necessarty to install or adjust tension on one or more garage door springs.

While we have described our new unit as being particularly suited for use in connection with garage door springs, it is believed apparent that our device can be used in many other situations where elongate coil tension springs must, in the course of working upon such springs and their related machanisms, be tensioned and extended.

Having illustrated and described only one typical preferred form and embodiment of our invention, we do not wish to be limited to the specific details herein set forth, but wish to reserve ourselves by modifications and/or variations that might appear to those skilled in the art and which fall within the scope of the following claims.

Having described our invention, we claim:

1. A spring extending device comprising an elongate frame with upper and lower ends, inner and outer sides and oppositely disposed lateral sides, a spring engaging saddle at the inner side of the frame engageable with an exterior side of an elongate helical tension spring on an axis parallel with and spaced inward of the frame, an elongate flexible spring-engaging girdle with one end anchored at one side of the frame and extending inwardly laterally and outwardly about a spring adjacent said inner side of the frame and releasable connecting means at the other side of the frame releasably connecting the other end portion of the girdle to the frame, a windlass carried by the frame and including an elongate laterally extending drum with opposite ends rotatably supported at opposite sides of the frame, a ratchet wheel at one end of the drum, an elongate pawl with one end pivotally connected to a side of the frame and having a dog at its other end releasably engaging the ratchet wheel, a drive head at one end of the drum accessible at the exterior of the frame, an elongate flexible tow line with one end portion connected with and wound about the drum and having a free end portion extending longitudinally froṁ the frame and a tow line connector on the free end of the tow line to connect with a reactive structure spaced from that end of the frame disposed in the direction a related spring is to be extended.

2. The device set forth in claim 1 wherein said saddle has a longitudinal central axis which is parallel with the central longitudinal axes of the frame and a related spring and has an inwardly opening spring seat with laterally outwardly and inwardly diverging surfaces.

3. The device set forth in claim 1 wherein the girdle and saddle are positioned longitudinally of the frame and a related spring so that the girdle holds the spring seated in said saddle.

4. The device set forth in claim 1 wherein said saddle has a longitudinal central axis which is parallel with the central longitudinal axes of the frame and a related spring and has an inwardly opening spring seat with laterally outwardly and inwardly diverging surfaces, the girdle and saddle are positioned longitudinally of the frame and a related spring so that the girdle holds the spring seated in said saddle.

5. The device set forth in claim 1 wherein the frame has an inner wall and laterally spaced side walls defining said inner and outer sides of the frame.

6. The device set forth in claim 1 wherein the frame has an inner wall and laterally spaced side walls defining said inner and outer sides of the frame, said saddle is defined by at least one inwardly turned laterally extended flange at one end of said inner wall, said flange has an inwardly disposed laterally extending sprng engaging seat.

7. The device set forth in claim 1 wherein the frame has an inner wall and laterally spaced side walls defining said inner and outer sides of the frame, one side wall has a window through which said one end of the girdle extends and has an opening in said other wall, an elongate laterally extending fastener shanak is engaged through said opening in said other wall and has one end connected with said one end of the girdle and a nut on the shank and engaging the exterior surface of said other side wall.

8. The device set forth in claim 1 wherein the frame has an inner wall and laterlly spaced side walls defining said inner and outer sides of the frame, one side wall has a window through which said one end of the girdle extends and has an opening in said other wall, an elongate laterally extending fastener shank is engaged through said opening in said other wall and has one end connected with said one end of the girdle and a nut on the shank and engaging the exterior surface of said other side wall, said releasable connecting means includes a girdle engaging cleat at said other side wall of the frame.

9. The device set forth in claim 1 wherein the frame has an inner wall and laterally spaced side walls defining said inner and outer sides of the frame, one side wall has a window through which said one end of the girdle extends and has an opening in said other wall, an elongate laterally extending fastener shank is engaged through said opening in said other wall and has one end connected with said one end of the girdle and a nut on the shank and engaging the exterior suface of said other side wall, said girdle is a length of link chain, said releasable connecting means comprises a laterally and outwardly opening elongate slot in said other side wall and defining a chain link engaging cleat in which a laterally extending chain link on a plane parallel with the longitudinal axis of the slot is slidably engaged.

10. The device set forth in claim 1 wherein said head is an elongate axially extending enlargement at one end of the drum, said head has a plurality of circumferentially spaced radially outwardly opening ratchet notches at one end portion thereof and defines said ratchet wheel.

* * * * *